2,889,335

PROCESS FOR PREPARING C-TRICYANOVINYL COMPOUNDS AND A NEW CLASS OF TRICYANOVINYL AROMATIC COMPOUNDS ADAPTED FOR USE AS DYES

Richard E. Heckert, Richmond, Va., assignor to E. I. du Pont de Nemours and Company, Wilmington, Del., a corporation of Delaware No Drawing. Application January 14, 1955
Serial No. 481,971

4 Claims. (Cl. 260—313)

This invention relates to a process of preparing organic compounds and to a new class of organic compounds and, more particularly, to a process of preparing C-tricyanovinyl compounds and to a new class of C-tricyanovinyl compounds adapted for use as dyes. This application is a continuation-inpart of my application Serial No. 382,857, filed September 28, 1953, now abandoned.

The present invention is concerned with compounds having the characteristic grouping

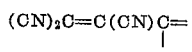

which are C-tricyanovinyl compounds, as distinguished from compounds having the characteristic grouping $(CN)_2C=C(CN)N<$ which are N-tricyanovinyl compounds. The latter compounds and their preparation are disclosed and claimed in my application Serial No. 382,859, filed September 28, 1953, now Patent No. 2,762,832, and entitled "Nitrogen Compounds and Preparation of Same." Both types of compounds contain the tricyanovinyl group $(CN)_2C=C(CN)-$ but in the first instance is bonded to carbon and in the second to nitrogen.

Synthetic dyes in an ever-increasing variety of color and adaptability are well known in the field of organic chemistry. In the vast array of available dyes it has become evident that those possessing the strongest colors and characterized by the greatest fastness are frequently those with molecules of a high degree of chemical complexity. While this characterization of preferred dyes may be more a matter of degree than kind, it is easy to understand that every component in the molecule of a desired complex organic chemical such as one of the modern dyes may represent a separate and costly step in the synthesis of the compound. It is equally obvious that if highly colored, fast dyes with smaller molecular weights and fewer component structures could be prepared, it would represent a substantial reduction in the difficulty and cost of dye manufacture.

An object of the present invention is to provide a new class of C-tricyanovinyl compounds. A further and more specific object is to provide a new class of relatively simple compounds of this type which are useful as dyes. Another object is to provide an economical process for preparing C-tricyanovinyl compounds. Other objects will become apparent from the description of the invention given hereinafter.

The above objects are accomplished according to the present invention which comprises a new class of compounds represented by the formula, $$(CN)_2C=C(CN)-R-R'_n$$

wherein R is a cyclic aromatic nucleus comprising either a carbocyclic aromatic ring or a resonance-stabilized heterocyclic aromatic ring, the tricyanovinyl group is bonded to annular carbon in R, R′ is an auxochrome substituent bonded to another annular carbon in R, $n$ is a whole number from 0 to X—1, X being the number of ring carbons in R, and $n$ is at least 1 when the ring is carbocyclic; and the invention further comprises a process for preparing these compounds by oxidizing an alpha,-beta,beta-tricyanoethyl compound, in which the alpha,-beta,beta-tricyanoethyl substituent is bonded to carbon, to the corresponding C-tricyanovinyl compound.

The new class of C-tricyanovinyl compounds forming a part of this invention are all characterized by being cyclic aromatic compounds which contain a tricyanovinyl substituent

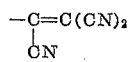

bonded to an annular carbon of an aromatic ring. In addition, these compounds are characterized either by having an annular hetero atom, such as nitrogen, oxygen, or sulfur, in this aromatic ring or by having at least one auxochrome substituent bonded to a second annular carbon. The preferred compounds are the carbocyclic aromatic compounds containing a single six-membered carbon nucleus and the heterocyclic aromatic compounds containing a single five membered nucleus consisting of four carbons and a nitrogen, inasmuch as these compounds are exceptional dyes.

The term "cyclic aromatic compound" is used herein in its usual meaning as generic to compounds having a closed ring containing at least two substituted or unsubstituted aromatic —CH=CH— units, and having the maximum number of such aromatic units possible for the number of carbon atoms present in the ring, thereby excluding the dihydro, tetrahydro, etc., derivatives of such rings, which are alicyclic rather than aromatic compounds. In the compounds of this invention, of course, at least one hydrogen of at least one of the aromatic —CH=CH— units is replaced by a substituent, and substituents may replace all of the aromatic hydrogens.

The term "auxochrome substituent" is used herein in its commonly accepted chemical sense to denote simple monovalent groups, such as —NR$_2$, —NHR, —NH$_2$, —OH, —OR, —SO$_3$H, —SO$_3$R, —COOH, —COOR and -halogen (R being hydrocarbon or substituted hydrocarbon), which augment the action of chromophoric groups in producing color in organic compounds. Of the auxochrome groups, the amino, substituted amino, hydroxyl, alkoxyl, and halogen substituents produce the strongest colors when present in the aromatic compounds of this invention, and such substituted compounds are therefore preferred.

It has been observed that in most, but not all, instances the addition of extra auxochrome substituents into an auxochrome-substituted tricyanovinylbenzene diminishes slightly the hydrolytic stability of the dye, reduces the molecular extinction coefficient and produces a color shift away from the violet end of the visible spectrum. Therefore, for their superior colors and enhanced utility as dyes, there are preferred the monoauxochrome-substituted tricyanovinylbenzenes. Of this group the tricyanovinylanilines are preferred, particularly the p-tricyanovinylanilines in which anilino nitrogen is secondary or tertiary. Such compounds may be indicated by the formula

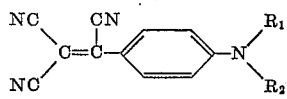

in which R$_1$ is hydrogen, hydrocarbon or substituted hydrocarbon and R$_2$ is hydrocarbon or substituted hydrocarbon.

In general, the new class of C-tricyanovinyl compounds of this invention are highly colored crystalline solids which are substantive as dyes to a wide variety of natural and synthetic fibers. It is not uncommon to find strong color as a characteristic of organic compounds with such relatively simple structures but it is most surprising to find that the instant compounds are not only highly colored but are substantive as dyes and, when used as dyes, impart strong, wash-fast and fade-resistant colors to textiles.

The present invention provides an economical process for preparing these compounds by oxidizing certain alpha,beta,beta-tricyanoethyl compounds to the corresponding C-tricyanovinyl compounds. It has been found that compounds containing the alpha,beta,beta-tricyanoethyl substituent,

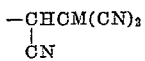

wherein M represents either hydrogen or a metal, bonded to carbon, can be oxidized to the corresponding C-tricyanovinyl compound with unexpected ease. Relatively mild conditions will effect this oxidation and are preferred. For example, oxidizing agents having an oxidizing potential of +.70 to +2.00 volts, and a temperature of 40° C. to 150° C. are preferred. Temperatures from room temperature (about 25° C.) up to the decomposition temperature of the reactants are operative although lower temperatures in this range may unduly prolong the reaction time.

A wide variety of oxidizing agents are effective in this process, and the oxidation process of this invention can be carried out by merely exposing the tricyanoethyl compond in the form of a fine powder to the action of the air. However, for greater convenience and more practical large-scale operation, it is preferred to carry out the oxidation in a solution of the oxidizing agent in a mutual solvent for the tricyanoethyl compound and the oxidizing agent. Suitable oxidizing agents, arranged in descending order of preferences, include red lead oxide ($Pb_3O_4$), lead tetraacetate, hydrogen peroxide, benzoyl peroxide, nitric acid, chlorine, bromine, N-bromosuccinimide, calcium hypochlorite, oxygen and air.

The process of this invention is especially useful for preparing the particular class of C-tricyanovinyl compounds herein described as useful for dyes. However, the process is suitable for preparing C-tricyanovinyl compounds in general, being applicable for the oxidation of any compound in which the alpha,beta,beta-tricyanoethyl substituent is bonded to carbon. The process is equally applicable to tricyanoethyl compounds as such and metal salts thereof, that is, those compounds in which the hydrogen bonded to the beta carbon is replaced by metal. The term "alpha,beta,beta-tricyanoethyl" is used herein to denote this substituent regardless of whether the beta carbon carries hydrogen or a metal, the two being equivalents in so far as this process is concerned inasmuch as this atom attached to the beta carbon is eliminated during the oxidation.

Additional C-tricyanovinyl compounds can be prepared by nitration, sulfonation or acetylation of C-tricyanovinyl compounds. Thus, N,N-dimethyl-2-nitro-4-tricyanovinylaniline is prepared by nitration of N,N-dimethyl-p-tricyanovinylaniline with a mixture of 90% nitric acid and acetic acid at 15° C. Sulfonation of N,N-dimethyl-p-tricyanovinylaniline by treatment with oleum yields 2-dimethylamino-5-tricyanovinylbenzenesulfonic acid. This acid is converted to its alkyl esters by reaction with $PCl_5$ and treating the resulting acid chloride with alcohols, i.e., methanol, ethanol, and the like. Refluxing a solution of p-tricyanovinylaniline in acetic anhydride gives p-tricyanovinylacetanilide. This is a yellow dye.

Certain of the new compounds of this invention can also be prepared by the reaction of tetracyanoethylene with the types of aromatic amines and phenols specified below. Tetracyanoethylene, $(CN)_2C=C(CN)_2$, can be prepared by the reaction of sulfur monochloride with malononitrile, conveniently in the presence of an inert liquid diluent, and thereafter separating the tetracyanoethylene formed from the reaction mixture.

The reaction of tetracyanoethylene with aromatic amines to form C-tricyanovinyl compounds included in the class of compounds of this invention can be carried out readily under mild conditions, generally at a temperature of 50° C. or somewhat higher and atmospheric pressure and, preferably, in the presence of an organic liquid inert to the reactants. The aromatic amines adapted to give C-tricyanovinyl compounds upon reaction with tetracyanoethylene are:

(1) Primary aromatic amines in which neither of the annular carbons immediately adjacent to the carbon bonded to the amino substituent is directly bonded to hydrogen or halogen and in which hydrogen is bonded to the annular carbon in the 4-position, considering the carbon bonded to the amino substituent as being in the 1-position;

(2) Secondary and tertiary aromatic amines in which hydrogen is bonded to the annular carbon in the 4-position;

(3) Heterocyclic aromatic amines in which the ring is resonance stabilized, the ring contains at least one carbon directly bonded to hydrogen, and only two bonds of the nitrogen are attached to the ring.

Resonance in organic molecules and its effect on their stability is discussed in detail by G. W. Wheland in his book "The Theory of Resonance," John Wiley & Sons, New York, 1944.

The reaction of tetracyanoethylene with the amines noted above to form C-tricyanovinyl amines takes place by a unique condensation in which the elements of hydrogen cyanide are lost. In the C-tricyanovinyl amines formed by the reaction of tetracyanoethylene with the aromatic amines noted above, the tricyanovinyl substituent becomes attached to the aromatic ring at the 4-position. In the C-tricyanovinyl amines formed by the reaction of tetracyanoethylene with the heterocyclic amines noted above, when the heterocyclic amine contains more than one annular carbon directly bonded to hydrogen, the tricyanovinyl group replaces preferentially that hydrogen which is the more readily replaced in other alkylation reactions. This process involving the reaction of tetracyanoethylene with certain amines of aromatic character is more fully disclosed and claimed in my copending application Serial No. 382,860, filed September 28, 1953, and entitled "Preparation of Organic Compounds," now Patent No. 2,762,810.

The reaction of tetracyanoethylene with phenols can be carried out under conditions as noted above in the reaction with amines. Any phenol which contains at least one hydrogen bonded to annular carbon at either the ortho or para position relative to the hydroxy group may be used. When there is a hydrogen at the para position, the C-tricyanovinyl compounds formed with tetracyanoethylene will generally have the tricyanovinyl substituent on the annular carbon in the 4-position, considering the carbon carrying the hydroxyl substituent as being in the 1-position. The process involving this reaction is more fully described and claimed in my copending application Serial No. 382,858, filed September 28, 1953, and entitled "Preparation of Aromatic Compounds," now Patent No. 2,762,833.

The following examples in which all proportions are by weight unless otherwise stated, illustrate the preparation of specific compounds of the class herein considered. Examples I to III also illustrate specific embodiments of the process of this invention. In Examples IV to XV and XVIII to XX the compounds are prepared by the reaction of tetracyanoethylene and amines and in Examples XVI and XVII by the reaction of tetracyanoethylene with phenols.

All absorption and molecular extinction data shown in this application were measured on a Cary recording spectrophotometer built by the Applied Physics Corporation of Pasadena, California. The terms used are explained by Brode, W. R., "Chemical Spectroscopy," John Wiley & Sons, New York, 1939, page 4.

EXAMPLE I

A. *Preparation of 4-(alpha,beta,beta-tricyanoethyl)-N,N-dimethylaniline*

To 180 parts of 50% aqueous ethanol are added 20 parts of p-dimethylaminobenzalmalononitrile and 13 parts of potassium cyanide. The mixture is warmed and stirred on a steam table for 3–4 minutes to complete solution. The solution is filtered and diluted with 200 parts of water containing 21 parts of acetic acid. The precipitate of 4-(alpha,beta,beta-tricyanoethyl)-N,N-dimethylaniline is collected on a filter, washed with water, and dried to give 21 parts by weight (92% yield) of product with an indicated melting point of 125–130° C. as determined with a preheated Fisher block. A sample for analysis is recrystallized twice from 60% aqueous ethanol after treatment with Darco and dried in vacuo at 80° C.; the purified sample gave M.P. 138–9° C.

*Analysis.*—Calc. for $C_{13}H_{12}N_4$: C, 69.6; H, 5.4; N, 25.0. Found: C, 69.49, 69.79; H, 5.41, 5.69; N, 24.92, 24.96.

The analyses support the following structure:

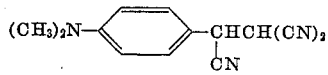

B. *Preparation of 4-tricyanovinyl-N,N-dimethylaniline*

To 210 parts of glacial acetic acid and 20 parts of 4-(alpha,beta,beta-tricyanoethyl) - N,N-di-methylaniline is added 44 parts of lead tetraacetate. The solution is stirred and heated to 100° C. for two hours. Immediate reaction is accompanied by the formation of the deep red color characteristic of the dye. An additional 52 parts of acetic acid is added to wash down the sides of the flask, and the dark red solution is allowed to cool slowly to room temperature. Lustrous dark blue needles of 4-tricyanovinyl-N,N-dimethylaniline separate and are collected on a filter and washed several times with cold acetic acid and ether; the dry weight being 7.8 parts (39% yield).

*Analysis.*—Calc. for $C_{13}H_{10}N_4$: C, 70.2; H, 4.54; N, 25.2. Found: C, 70.15, 70.47; H, 4.38, 4.56; N, 25.06, 24.97.

Analysis of the visible and ultraviolet absorption spectra of this product shows a molecular extinction coefficient at 515 m$\mu$ of 36,200.

EXAMPLE II

This example illustrates that it is not necessary to isolate and purify the intermediate tricyanoethyl compound.

A. *Preparation of crude 4-(alpha,beta,beta-tricyanoethyl)-N,N-dimethylaniline*

To a suspension of 100 parts of p-dimethylaminobenzalamalonitrile in 197 parts of ethanol is added 65 parts of potassium cyanide dissolved in 250 parts of distilled water. The mixture is stirred and warmed on the steam bath until the solids dissolve. Hot water, 1000 parts, is added and the solution is filtered after treatment with Darco. The filtrate is acidified with 105 parts of glacial acetic acid, and the crude 4-(alpha,beta,beta-tricyanoethyl)-N,N-dimethylaniline which precipitates is collected on a filter and washed exhaustively with water. The damp crude dihydro intermediate is divided into two equal portions and treated separately as described under Parts B and C hereafter.

B. *Oxidation with lead tetraacetate*

To 525 parts of glacial acetic acid and 150 parts of lead tetraacetate is added one portion of the crude wet dihydro compound described in Part A above. The mixture is refluxed and stirred for two hours. The hot solution is filtered and cooled. The crystals, lustrous blue-black plates of 4-tricyanovinyl-N,N-dimethylaniline, which separate are collected on a filter and dried to give 20 parts by weight (35% over-all yield from p-dimethylaminobenzalmalononitrile).

*Analysis.*—U.V.: $\epsilon_{M\ 514\ m\mu}=39{,}500$.

C. *Oxidation with benzoyl peroxide*

The remaining half of the crude damp dihydro intermediate is refluxed in 525 parts of glacial acetic acid with 100 parts of benzoyl peroxide for two hours. The solution is filtered hot, and the filtrate is cooled with an ice bath. The crystals of 4-tricyanovinyl-N,N-dimethylaniline are collected on a filter and air dried to give 17 parts by weight (30% over-all yield).

*Analysis.*—U.V., visible: $\epsilon_{M\ (514\ m\mu)}=40{,}600$.

EXAMPLE III

This example illustrates that the potassium salt of the tricyanoethyl intermediate can be oxidized directly to the tricyanovinyl compound.

To 100 parts of p-dimethylaminobenzalmalononitrile in 396 parts of methanol is added 40 parts of potassium cyanide. The mixture is stirred and refluxed for 15 minutes and cooled to room temperature. Diethyl ether, 1427 parts, is added, and the mixture is stirred and cooled to 0° C. The precipitate is collected on a filter, washed with ether and air dried at 40–50° C. The potassium salt is mixed with 250 parts of lead tetraacetate, and 525 parts of glacial acetic acid is added. There is an immediate exothermic reaction, and the mixture is stirred and refluxed for fifteen minutes. The solution is cooled and poured slowly into ice water with vigorous stirring. The solid 4-tricyanovinyl-N,N-dimethylaniline is collected on a filter, washed with water and air dried to give 52 parts by weight (46% crude yield).

*Analysis.*—U.V.: $\epsilon_{M\ 504\ m\mu}=28{,}000$.

On the basis of absorption of purer samples obtained as in Examples I and II, this crude product is estimated to contain about 70% of 4-tricyanovinyl-N,N-dimethylaniline.

EXAMPLE IV

A solution of 10 parts of tetracyanoethylene and 266 parts of pure tetrahydrofuran is prepared, and 12.8 parts of N-methylaniline is added dropwise. An intense blue color develops which darkens slightly, becoming purplish. The solvent is boiled off on a steam table leaving N-methyl-p-tricyanovinylaniline in the form of a crystalline, bright blue solid; weight, 20 parts. The crystalline solid is sparingly soluble in methanol and ethanol (bright burgundy solutions), and dyes filter paper red. Samples for analysis are recrystallized from methyl alcohol and dried at 80° C. in vacuo.

*Analysis.*—Calc. for $C_{12}H_8N_4$: C, 69.20; H, 3.9; N, 26.9. Found: C, 69.44, 69.17; H, 3.85, 3.87; N, 26.87, 26.88.

The infrared spectrum shows strong N-H absorption, indicating substitution on the ring. Strong absorption at 12.1 microns suggests para-disubstitution of the benzene nucleus. Bands for conjugate unsaturation and nitrile are prominent. The molecular extinction coefficient at 500 m$\mu$ is 33,250. The structure of the N-methylaniline derivative is thought to be:

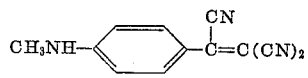

EXAMPLE V

A solution of 10 parts of tetracyanoethylene in 178 parts of dry tetrahydrofuran is treated with 19.3 parts of N,N-dimethylaniline. A deep blue color forms immediately. The mixture is refluxed on a steam table, and the tetrahydrofuran is boiled off. The residue consists of N,N-dimethyl-p-tricyanovinylaniline in the form of a bright blue crystalline solid, weight 16 parts, sparingly soluble in ethyl alcohol. The solid is washed by suspension with 143 parts of diethyl ether and recrystallized from ethyl alcohol.

*Analysis.*—Calc. for $C_{13}H_{10}N_4$: C, 70.2; H, 4.54; N, 25.2. Found: C, 70.40, 70.21; H, 4.60, 4.42; N, 24.97, 25.25.

Elemental analyses agree with theory for the product of 1 mole of tetracyanoethylene and 1 mole of amine minus hydrogen cyanide. Infrared analysis indicates a disubstituted benzene, probably para. The molecular extinction coefficient in the visible at peak absorption (515 millimicrons) is 33,750. The probable structure is:

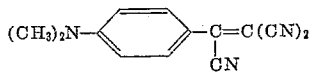

By substituting m-hydroxy-N,N-dimethylaniline for the N,N-dimethylaniline above, there is obtained N,N-dimethyl-m-hydroxy-p-tricyanovinylaniline.

EXAMPLE VI

To 50 parts of tetracyanoethylene in 266 parts of tetrahydrofuran is added slowly 50 parts of 2,6-dimethylaniline. The mixture is refluxed six hours and evaporated to dryness on the steam table under a jet of air. The residue is very sparingly soluble in ethanol and acetic acid. When collected on a filter, washed with hot acetic acid, and dried, the residue comprising 2,6-dimethyl-4-tricyanovinylaniline weighs 45 parts (52% yield). A sample after two recrystallizations from nitromethane melts at 288–9° C. and is a brilliant dark blue.

*Analysis.*—Calc. for $C_{13}H_{10}N_4$: C, 70.2; H, 4.54; N, 25.2. Found: C, 70.43, 70.18; H, 4.81, 4.60; N, 25.69, 25.71. U.V.: $\epsilon_{M\ 500\ m\mu}$=28,000.

Some absorption occurs at 370 m$\mu$, probably due to a minor amount of N-substituted product.

A portion of the 2,6-dimethyl-4-tricyanovinylaniline is recrystallized from acetic acid, dried, and analyzed.

*Analysis.*—Found: N, 25.04, 24.92. U.V.: $\epsilon_{M\ 500\ m\mu}$=35,500.

EXAMPLE VII

A solution of 128 parts of tetracyanoethylene and 89 parts of N-methylpyrrole in 475 parts of acetone is allowed to stand at room temperature for 30 minutes and is then poured into 2500 parts of water. After the black oil which precipitates has solidified, it is removed by filtration, dissolved in acetic acid, treated with Darco, and filtered. The filtrate is diluted with water, and the greenish-yellow preciptiate is recrystallized from dimethylformamide and washed with ether. There is obtained 130 parts (72% yield) of 1-methyl-2-tricyanovinylpyrrole in the form of a bright yellow crystalline material, M.P. 182–183° C. A sample is recrystallized from alcohol for analysis.

*Analysis.*—Calc. for $C_{10}H_6N_4$: C, 65.92; H, 3.24; N, 30.85. Found: C, 65.89, 65.96; H, 3.33, 3.35; N, 30.89, 30.98. U.V.: $\epsilon_M\ _{388\ m\mu}$=18,200.

The most probable structure for this compound is believed to be:

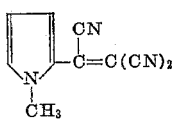

EXAMPLE VIII

A solution of 128 parts of tetracyanoethylene and 67 parts of pyrrole in 475 parts of acetone is allowed to stand at room temperature for one hour. The reaction mixture is poured into 10,000 parts of water. The precipitate which forms is recrystallized from alcohol (Darco) and then from ethyl acetate after treatment with Darco. There is obtained 75 parts (45% yield) of 2-tricyanovinylpyrrole in the form of a yellow-orange crystalline material which melts at 211–213° C. with some decomposition starting at 205° C. The compound is soluble in 10% sodium hydroxide and is precipitated unchanged with dilute acid. This probably indicates a relatively acidic hydrogen.

*Analysis.*—Calc. for $C_9H_4N_4$: C, 64.28; H, 2.40; N, 33.32. Found: C, 64.19, 64.33; H, 2.48, 2.52; N, 33.33, 33.21.

The infrared spectrum has an absorption at 3.0$\mu$ for a N—H bond, indicating that the substitution is on a ring carbon rather than on the nitrogen. The visible absorption maximum is at 428 m$\mu$ ($\epsilon_M$=25,700). Some absorption occurs at 275 m$\mu$, which might be due to a minor amount of the N-substituted product.

These facts are in agreement with the following structure:

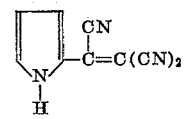

EXAMPLE IX

N-methyl-N-(beta-cyanoethyl)aniline, 56 parts, is added slowly to 50 parts of tetracyanoethylene in 444 parts of tetrahydrofuran. The solution is refluxed 18 hours, and the solvent is removed on a steam table. There remains a dark red tar. A small amount of crystalline material is obtained by dissolving the residue in acetic acid and adding water. The suspended solid is decanted from a larger quantity of tar which "oils" out and is collected on a filter. The product is identified as N-methyl-N-(beta-cyanoethyl)-p-tricyanovinylaniline (weight 18 parts, 18% yield), M.P. 159–60° C. (preheated block).

*Analysis.*—Calc. for $C_{15}H_{11}N_5$: C, 68.9; H, 4.2; N, 26.8. Found: C, 68.74, 68.41; H, 4.41, 4.34; N, 26.88, 26.77. U.V.: $\epsilon_M\ _{498\ m\mu}$=30,500.

The analytical data are consistent with the structure:

EXAMPLE X

To 50 parts of tetracyanoethylene dissolved in 444 parts of tetrahydrofuran is added 71 parts of N-butyl-N-(beta-cyanoethyl)aniline. The reaction mixture is refluxed for 18 hours, and the solvent is removed on the steam table. The residue is triturated with hot ethanol until it is largely dissolved and stirred until cool. The crystalline N-butyl-N-(beta-cyanoethyl)-p-tricyanovinylaniline which separates is collected on a filter and dried (weight, 52 parts; 44% yield), M.P. 128–9° C. (preheated block).

*Analysis.*—Calc. for $C_{18}H_{17}N_5$: N, 23.1. Found: N, 25.77, 25.08. U.V.: $\epsilon_M\ _{505\ m\mu}$=23,300.

The absorption in the visible consists of a single peak with the maximum at 505 m$\mu$ indicated. Although the compound is not obtained analytically pure, a single colored substance is present. On the basis of molecular extinctions normally observed for:

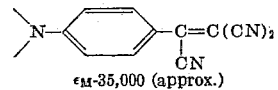

this material is about 66%:

EXAMPLE XI

To 50 parts of tetracyanoethylene and 444 parts of tetrahydrofuran is added 50 parts of tetrahydroquinoline. The reaction mixture is refluxed 8 hours. Solvent is removed on the steam table, and the solid residue is dissolved in 790 parts of alcohol. Water is added slowly to precipitate the dye, and the solid 6-tricyanovinyl-1,2,3,4-tetrahydroquinoline is collected on a filter and dried (weight 65 parts, 73% yield). A sample pulverized and dried in vacuo, M.P. 187° C. (preheated block), is analyzed.

*Analysis.*—Calc. for $C_{14}H_{10}N_4$: N, 23.9. Found: N, 26.06, 25.87. U.V.: $\epsilon_{M\ 525\ m\mu}$=24,300.

Visible absorption contains a single peak. The estimated purity is 70%. The analyses are in accord with the structure:

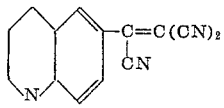

EXAMPLE XII

Diphenylamine, 70 parts, and tetracyanoethylene, 50 parts, are dissolved in 178 parts of tetrahydrofuran, and the solution is refluxed 18 hours. The solvent is removed on the steam table, and the residue is heated at 100° C. for about one hour until crystallization commences. The residue is triturated with 714 parts of ether, and the suspended solid N-phenyl-p-tricyanovinylaniline is collected on the filter; the dry weight was 63 parts (59% yield), M.P. 157–8° C. (preheated block).

*Analysis.*—Calc. for $C_{17}H_{10}N_4$: C, 75.5; H, 3.7; N, 20.7. Found: C, 75.89, 75.11; H, 3.55, 3.60; N, 21.14, 21.04. U.V.: $\epsilon_{M\ 512\ m\mu}$=33,500.

The above example is repeated and the product displays a molecular extinction of 37,000. The analytical data are in accord with the structure:

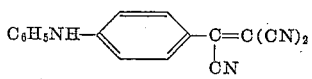

By substituting m-hydroxydiphenylamine for the diphenylamine above, there is obtained N-phenyl-m-hydroxy-p-tricyanovinylaniline.

EXAMPLE XIII

To 50 parts of tetracyanoethylene in 266 parts of tetrahydrofuran is added 55 parts of N-phenylethanolamine. The solution is refluxed 8 hours and evaporated at room temperature. The crystalline residue is slurried with cold ethanol and filtered to give a somewhat tacky solid. The solid is dissolved in hot acetic acid, precipitated with ether, collected on a filter, and dried. The red-brown N-(p-tricyanovinylphenyl)ethanolamine product weighs 40 parts (43% yield), M.P. 162–3° C. (preheated block).

*Analysis.*—Calc. for $C_{13}H_{10}N_4O$: N, 23.5. Found: N, 23.22, 23.55. U.V.: $\epsilon_{M\ 502\ m\mu}$=32,600.

The analytical data are consistent with the structure:

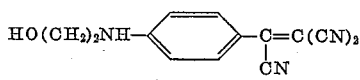

EXAMPLE XIV

To 50 parts of tetracyanoethylene in 266 parts of tetrahydrofuran is added 58 parts of N-(beta-cyanoethyl)-aniline, and the solution is refluxed 4 hours. Solvent is evaporated off in a crystallizing dish at room temperature leaving a tar which crystallizes after standing several days. The mixture is suspended in about 560 parts of 1/4 acetic acid/diethyl ether, stirred at room temperature for a few minutes, cooled, and filtered. A small amount of solid (5.5 parts, 6% yield) is obtained, M.P. 140° C. The filtrate and ether washes are combined and evaporated to near dryness. The viscous residue is warmed to about 40° C. for about 20 hours, whereupon considerable material crystallizes. The residue is triturated with ether containing about 5% by volume of acetic acid and filtered. The crystals of N-(beta-cyanoethyl)-p-tricyanovinylaniline are washed with ether and dried (33.5 parts, 35% yield), M.P. 131–2° C.

*Analysis.*—Calc. for $C_{14}H_9N_5$: N, 28.3. Found: N, 29.01, 28.75. U.V. $\epsilon_{M\ 487\ m\mu}$=32,900.

The analytical data are in accord with the structure:

EXAMPLE XV

Tetracyanoethylene, 42 parts, N-(beta-cyanoethyl)-o-toluidine, 53 parts, and 266 parts of dry tetrahydrofuran are mixed and refluxed 8 hours. The solution is poured into an evaporating dish, and the solvent is removed with a gentle stream of air (room temperature). The residual tar partially solidifies on standing overnight and is triturated with 300 parts of acetic acid. Diethyl ether, 715 parts, is added. The mixture is cooled to 0° C. and filtered. The solid N-(beta-cyanoethyl)-o-methyl-p-tricyanovinylaniline is then washed on the filter with cold diethyl ether/acetic acid and dried (weight 37.8 parts, 44% yield), M.P. 161–2° C. (preheated block).

*Analysis.*—Calc. for $C_{15}H_4N_5$: N, 26.8. Found: N, 29.13, 29.25. U.V.: $\epsilon_{M\ 485\ m\mu}$=30,300.

The analytical data are in accord with the structure:

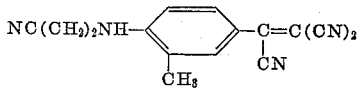

EXAMPLE XVI

To 50 parts of tetracyanoethylene and 48 parts of 2,6-dimethylphenol in 266 parts of tetrahydrofuran is added 49 parts of pyridine. The pyridine, added dropwise, causes the solution to warm nearly to boiling. The solution is refluxed for two hours and is allowed to stand three days. Black crystals which deposit are collected on a filter and washed by suspension in ether. The dry product weighed 27 parts, M.P. 184–5° C. (dec., preheated Fisher block). On heating or exposure to air, the crystals become red and finally orange. The mother liquor and the ether washes are evaporated to dryness to give an additional 47 parts of black crystals. The solids are combined and recrystallized twice from aqueous acetic acid. The product, 2,6-dimethyl-4-tricyanovinylphenol in the form of orange needles, M.P. 182–3° C. (dec.), weighs 25 parts.

*Analysis.*—Calc. for $C_{13}H_9N_3O$: C, 69.9; H, 4.06; N, 18.8. Found: C, 69.90, 70.02; H, 3.92, 4.12; N, 18.71, 18.73.

The compound is an indicator, being bright yellow in dilute acid and deep burgundy in alkaline solutions.

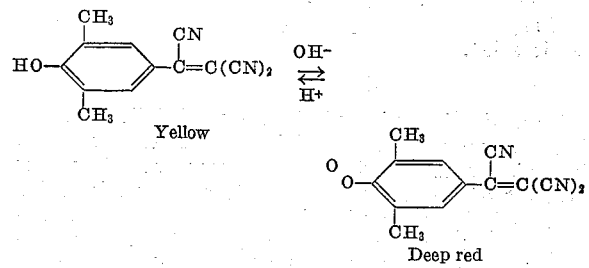

The ultraviolet absorption of the basic and acidic forms are determined by measurements in alcohol containing 5% triethylamine and 1% acetic acid, respectively.

U.V. $\epsilon_{M\ 538m\mu}$=48,000 (ethanol+5% triethylamine)
U.V. $\epsilon_{M\ 426\ m\mu}$=21,200 (ethanol+1% acetic acid)

EXAMPLE XVII

To 888 parts of tetrahydrofuran is added 50 parts of 2,6-dimethylphenol and 21 parts of sodium methoxide, The mixture is stirred, and 50 parts of tetracyanoethylene is added in one portion. The solution is refluxed four hours and cooled. Brilliant blue crystals of sodium 2,6-dimethyl-4-tricyanovinylphenolate which separate are collected on filter and washed with cold ether; dry wt., 33 parts. A bright yellow solution is obtained when a small amount of this material (presumably the sodium salt of 2,6-dimethyl-4-tricyanovinylphenol) is dissolved in acetic acid.

The filtrate is evaporated to dryness, and the residue is washed by suspension in 357 parts of cold ether. The crystalline residue is collected on a filter and washed with additional ether. Dry weight is 39 parts; total 72 parts (75% yield based on the sodium salt). The sodium salt is converted to the phenol and crystallized from 90% acetic acid after treatment with "Darco." Air dried, the orange needles of 2,6-dimethyl-4-tricyanovinylphenol weigh 27 parts (31% yield), melting point 177° C.

*Analysis.*—Visible: $\epsilon_{M\ (425\ m\mu)}=21,200$ (ethanol+1% acetic acid).

EXAMPLE XVIII

To a stirred solution of 10 parts of N,N-diethylaniline in 30 parts of pyridine at an initial temperature of 20° C. is gradually added 9.5 parts of tetracyanoethylene over a period of one to five minutes. The mixture is cooled sufficiently by means of an ice bath to maintain the temperature of the reaction mixture at 20–40° C. The mixtures is heated to 55° C., maintained at this temperature for five minutes, and cooled to 5° C. Forty parts of acetic acid is added, and the resultant solution is poured into 400 parts of ice and water with good stirring. 4-tricyanovinyl-N,N-diethylaniline precipitates as a dark blue solid (weight 16 parts, 95% yield). After recrystallization from acetic acid it melts at 164° C. Its absorption spectrum of visible light, taken in acetone solution, has a maximum at 521 millimicrons with a molecular extinction coefficient of 46,500. 4-tricyanovinyl-N,N-diethylaniline gives red dyeings on "Dacron" polyester fiber and blue-red dyeings on "Orlon" acrylic fiber. When suspended in a boiling aqueous dye-bath of pH 4, it is 50% destroyed in 5.5 hours. Analyses are in accord with the structure:

*Analysis.*—Calcd. for $C_{15}H_{14}N_4$: C, 72.0; H, 5.6; N, 22.4. Found: C, 71.8; H, 5.7; N. 22.3.

When the process of Example XVIII is repeated, using the aromatic amines shown in Table I in place of N,N-diethylaniline, the respective dyes shown in the table are obtained.

TABLE I.—TRICYANOVINYL DYES PREPARED FROM AROMATIC AMINES AND TETRACYANOETHYLENE

| Amine used | Tricyanovinyl dye | Calculated C | Calculated H | Calculated N | Found C | Found H | Found N | Melting point, °C. | Maximum (millimicrons) | Molecular extinction coefficient |
|---|---|---|---|---|---|---|---|---|---|---|
| N-phenylglycine | 4-tricyanovinyl-N-(carboxymethyl)aniline | 61.9 | 3.2 | 22.2 | 62.1 | 3.4 | 22.2 | 235–7 | 488 | 37,100 |
| N-isoamylaniline | 4-tricyanovinyl-N-isoamylaniline | 72.7 | 6.1 | 21.2 | 72.9 | 6.1 | 21.0 | 120–1 | 503 | 44,400 |
| N-benzylaniline | 4-tricyanovinyl-N-benzylaniline | 76.0 | 4.3 | 19.7 | 75.6 | 4.5 | 19.9 | 150–1 | 498 | 41,750 |
| N-phenylanthranilic acid | 2-carboxy-4'-tricyanovinyldiphenylamine | 68.8 | 3.2 | 17.8 | 68.9 | 3.9 | 17.4 | 215–16 | 483 | 27,400 |
| N-phenyl-1-naphthylamine | 4-tricyanovinyl-N-α-naphthylaniline | 78.8 | 3.8 | 17.5 | 78.8 | 4.0 | 17.6 | 210–12 | 498 | 36,800 |
| N-phenylmorpholine | N-(p-tricyanovinylphenyl)morpholine | 68.1 | 4.6 | 21.2 | 68.2 | 4.7 | 21.1 | 188–9 | 507 | 35,900 |
| N-ethyl-N-β-chloroethylaniline | 4-tricyanovinyl-N-ethyl-N-β-chloroethylaniline | 63.2 | 4.6 | 19.7 | 63.6 | 4.6 | 20.0 | 152–3 | 507 | 43,300 |
| N-methyl-N-β-cyanoethylaniline | 4-tricyanovinyl-N-methyl-N-β-cyanoethylaniline | 68.9 | 4.2 | 26.8 | 69.5 | 4.2 | 26.9 | 174–5 | 502 | 40,000 |
| N-ethyl-N-β-cyanoethylaniline | 4-tricyanovinyl-N-ethyl-N-β-cyanoethylaniline | 69.8 | 4.8 | 25.4 | 70.0 | 4.8 | 25.7 | 159–60 | 507 | 42,300 |
| N,N-bis-β-cyanoethylaniline | 4-tricyanovinyl-N,N-bis-β-cyanoethylaniline | 68.0 | 4.0 | 28.0 | 67.8 | 4.1 | 28.3 | 156 | 488 | 37,200 |
| N-β-cyanoethyl-N-β-benzoxyethylaniline | 4-tricyanovinyl-N-β-cyanoethyl-N-β-benzoxyethylaniline | 69.9 | 4.3 | 17.7 | 69.8 | 4.4 | 18.1 | 157–8 | 495 | 40,300 |
| N,N,di-n-propylaniline | 4-tricyanovinyl-N,N-di-n-propylaniline | 73.3 | 6.5 | 20.2 | 72.1 | 6.6 | 19.7 | 138–9 | 524 | 47,300 |
| N,N-di-n-butylaniline | 4-tricyanovinyl-N,N-di-n-butylaniline | 74.5 | 7.2 | 18.3 | 74.5 | 6.7 | 18.2 | 126–7 | 525 | 47,100 |
| Dibenzylaniline | 4-tricyanovinyl-N,N-di-benzylaniline | 80.2 | 4.8 | 15.0 | 79.2 | 4.8 | 15.0 | 167–8 | 507 | 44,500 |
| N,N-bis-β-benzoxyethylaniline | 4-tricyanovinyl-N,N-bis-β-benzoxyethylaniline | 71.0 | 4.5 | 11.4 | 71.0 | 4.6 | 11.4 | 185 | 505 | 41,700 |
| N-methyldiphenylamine | 4-tricyanovinyl-N-methyldiphenylamine | 76.0 | 4.3 | 19.7 | 76.1 | 4.4 | 19.6 | 108–9 | 509 | 40,900 |
| N-ethyldiphenylamine | 4-tricyanovinyl-N-ethyldiphenylamine | 76.5 | 4.7 | 18.8 | 76.7 | 4.9 | 18.7 | 147–8 | 511 | 43,500 |
| N-n-hexyldiphenylamine | 4-tricyanovinyl-N-hexyldiphenylamine | 77.9 | 6.3 | 15.8 | 78.2 | 6.3 | 15.9 | 88–9 | 513 | 43,900 |
| N-n-dodecyldiphenylamine | 4-tricyanovinyl-N-n-dodecyldiphenylamine | 79.4 | 7.8 | 12.8 | 79.0 | 7.8 | 13.0 | 77–8 | 513 | 43,400 |
| Julolidine (1,2,3,5,6,7-hexahydrobenzo[ij]quinolizine) | p-tricyanovinyljulolidine | 74.5 | 5.1 | 20.4 | 74.8 | 5.5 | 20.3 | 265–6 | 555 | 47,200 |
| Triphenylamine | 4-tricyanovinyl-N,N-diphenylaniline | 79.7 | 4.1 | 16.2 | 79.8 | 4.1 | 16.2 | 174–5 | 513 | 34,600 |
| Bis-β-(N-methylanilino)ethyl terephthalate | Bis-β-(N-methyl-4-tricyanovinylanilino)ethyl terephthalate | 68.2 | 4.1 | 17.7 | 68.7 | 4.5 | 17.2 | 284–5 | 519 | 69,100 |
| Indole | β-tricyanovinylindole | 71.5 | 2.8 | 25.7 | 71.4 | 2.9 | 25.7 | 275–6 | 453 | 20,700 |

Similarly the dyes of Table II are obtained by substituting the indicated substituted anilines in place of the N,N-diethylaniline of Example XVIII.

TABLE II.—TRICYANOVINYL DYES PREPARED FROM SUBSTITUTED ANILINES AND TETRACYANOETHYLENE

| Substituted aniline | Tricyanovinyl dye |
|---|---|
| N,N,N',N'-tetramethyl-m-phenylenediamine | N,N-dimethyl-m-dimethylamino-p-tricyanovinylaniline |
| 6-chloro-N,N-dimethyl-3-dimethylaminoaniline | 6-chloro-N,N-dimethyl-3-dimethylamino-4-tricyanovinylaniline |
| 6-chloro-N-ethyl-3-methylaniline | 6-chloro-N-ethyl-3-methyl-4-tricyanovinylaniline |
| N,N,3,6-tetramethylaniline | N,N,3,6-tetramethyl-4-tricyanovinylaniline |
| N,N-dimethylanthranilic acid | 2-dimethylamino-5-tricyanovinylbenzoic acid |
| Methyl ester of N,N-dimethylanthranilic acid | Methyl ester of 2-dimethylamino-5-tricyanovinylbenzoic acid |
| N-β-cyanoethyl-m-anisidine | N-β-cyanoethyl-p-tricyanovinyl-m-anisidine |
| N-β-hydroxyethyl-o-anisidine | N-β-hydroxyethyl-p-tricyanovinyl-o-anisidine |
| o-Bromo-N-isoamylaniline | o-Bromo-N-isoamyl-p-tricyanovinylaniline |

EXAMPLE XIX m-Chlorobenzoyl chloride (61 parts) is added gradually to a stirred solution of 50 parts of N-β-hydroxyethyl-N-methylaniline in 150 parts of pyridine at 50–60° C. The mixture is stirred at 80° C. for five minutes and cooled to 25° C. Tetracyanoethylene (44 parts) is gradually added at 25–35° C., and the mixture is stirred at 55° C. for five minutes. The mixture is cooled to 5° C., 250 parts of acetic acid is added, and the cold solution is added to 2500 parts of ice and water with good stirring. The solid that precipitates is separated by filtration, dried, and recrystallized from acetic acid to give 64 parts of N-(β-m-chlorobenzoxyethyl)-N- methyl - 4-tricyanovinyl-aniline melting at 131–136° C. It gives red dyeings with "Dacron" polyester fiber and "Orlon" acrylic fiber. Its visible light absorption spectrum, taken in acetone solution, has a maximum at 510 millimicrons with a molecular extinction coefficient of 40,200. Only 17% of the dye is destroyed when its suspension in an aqueous dye-bath of pH 4 is refluxed for 22 hours. Analyses are in accord with the structure:

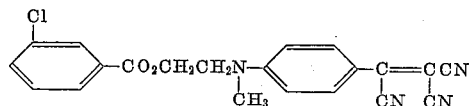

Analysis.—Calcd. for $C_{21}H_{15}ClN_4O_2$: C, 64.5; H, 3.9; Cl, 9.1. Found: C, 63.9; H, 4.0; Cl, 9.0.

When the process of Example XIX is repeated, using the acid chlorides shown in Table III in place of m-chlorobenzoyl chloride, the respective dyes shown in the table are obtained.

EXAMPLE XX

This example illustrates the use of N,N-dimethylformamide as a solvent for the reaction between tetracyanoethylene and aromatic amines. Tetracyanoethylene (58 parts) is added gradually to a solution of 75 parts of N,N-dimethylaniline in 150 parts of N,N-dimethylformamide at 75–40° C. The mixture is stirred at 50–60° C. for ten minutes, cooled to 0° C. and filtered to separate 78 parts of 4-tricyanovinyl-N,N-dimethylaniline. A second crop of 4-tricyanovinyl-N,N-dimethylaniline (20 parts) is obtained by pouring the filtrate into 2000 parts of ice and water. Recrystallization of the combined crops from acetic acid gives 83 parts of pure 4-tricyanovinyl-N,N-dimethylaniline.

The alpha, beta, beta-tricyanoethyl compounds used as starting materials in the oxidation process of this invention can be prepared by reaction of the appropriate aldehyde with malononitrile and then adding hydrogen cyanide to the resulting malononitrile. To illustrate, p-aminobenzaldehyde can be reacted with malononitrile, using the general method of Corson and Stoughton, J. Am. Chem. Soc. 50, 2825–37 (1928), and the resulting p-aminobenzalmalononitrile reacted with potassium cyanide, by the procedure of Part A of Example I, and the product acidified to yield 4-(alpha, beta, beta-tricyanoethyl) aniline. In accordance with the present invention this compound is then oxidized by the procedure of Part B of Example I to give 4-tricyanovinylaniline. The compounds of Table IV are prepared by this procedure from the indicated aldehydes.

It will be understood the above examples are merely illustrative and that the invention broadly comprises both the process of preparing C-tricyanovinyl compounds by oxidizing the corresponding alpha, beta, beta-tricyanoethyl compound and, as a new class of compounds which may be prepared by various methods, the cyclic aromatic compounds containing a tricyanovinyl substituent bonded to an annular carbon, the compound containing a member from the group consisting of an auxochrome substituent bonded to a second annular carbon, and an annular hetero atom.

TABLE III.—N-β-ACYLOXYETHYL-N-METHYL-4-TRICYANOVINYLANILINE DYES

| Acid chloride | Dye | Analyses | | | | | | Melting point, °C. | Light absorption of acetone solution | |
| --- | --- | --- | --- | --- | --- | --- | --- | --- | --- | --- |
| | | Calculated | | | Found | | | | Maximum (millimicrons) | Molecular extinction coefficient |
| | | C | H | N | C | H | N | | | |
| γ-carbethoxyvaleryl chloride | N-β-(γ-carbethoxyvaleroxy)-ethyl-N-methyl-4-tricyanovinylaniline. | 64.7 | 5.9 | 13.7 | 65.1 | 6.0 | 14.0 | 80–82 | 510 | 41,600 |
| Diethylacetyl chloride | N-β-(diethylacetoxy)-ethyl-N-methyl-4-tricyanovinylaniline. | 68.6 | 6.3 | 16.0 | 68.7 | 6.0 | 16.4 | 94–101 | 510 | 42,600 |
| Isovaleryl chloride | N-β-(isovaleroxy)-ethyl-N-methyl-4-tricyanovinylaniline. | 67.8 | 6.0 | 16.7 | 67.8 | 5.9 | 16.8 | 122–5 | 510 | 43,400 |
| Benzoyl chloride | N-β-benzoxyethyl-N-methyl-4-tricyanovinylaniline. | 69.8 | 4.7 | 16.3 | 69.3 | 4.5 | 16.0 | 141–2 | 510 | 40,600 |
| p-toluoyl chloride | N-β-p-toluoxyethyl-N-methyl-4-tricyanovinylaniline. | 71.3 | 4.9 | 15.1 | 71.5 | 5.1 | 14.9 | 144–5 | 511 | 41,600 |
| 4-methyl-3-nitrobenzoyl chloride | N-β-(4-methyl-3-nitrobenzoxy)ethyl-N-methyl-4-tricyanovinylaniline. | 63.6 | 4.1 | 16.9 | 63.7 | 4.2 | 16.8 | 153–4 | 510 | 40,600 |
| 1-naphthoyl chloride | N-β-(1-naphthoxy)-ethyl-N-methyl-4-tricyanovinylaniline. | 73.9 | 4.5 | 13.8 | 72.9 | 4.6 | 13.6 | 179–85 | 512 | 38,200 |

TABLE IV.—PREPARATION OF C-TRICYANOVINYL COMPOUNDS FROM AN ALDEHYDE AND MALONONITRILE

| Aldehyde | Malononitrile derivative | α,β,β-Tricyanoethyl compound | C-tricyanovinyl compound |
| --- | --- | --- | --- |
| o-Aminobenzaldehyde | o-Aminobenzalmalononitrile | 2-tricyanoethylaniline | 2-tricyanovinylaniline. |
| o-Hydroxybenzaldehyde | o-Hydroxybenzalmalononitrile | 2-tricyanoethylphenol | 2-tricyanovinylphenol. |
| m-Hydroxybenzaldehyde | m-Hydroxybenzalmalononitrile | 3-tricyanoethylphenol | 3-tricyanovinylphenol. |
| p-Hydroxybenzaldehyde | p-Hydroxybenzalmalononitrile | 4-tricyanoethylphenol | 4-tricyanovinylphenol. |
| Furfural | Furfurylidenemalononitrile | 2-tricyanoethylfuran | 2-tricyanovinylfuran. |
| 2-thiophenealdehyde | 2-Thienylidenemalononitrile | 2-tricyanoethylthiophene | 2-tricyanovinylthiophene. |
| Anisaldehyde | Anisalmalononitrile | p-Tricyanoethylanisole | p-Tricyanovinylanisole. |
| p-Phenoxybenzaldehyde | p-Phenoxybenzalmalononitrile | p-Tricyanoethylphenoxybenzene | p-Tricyanovinylphenoxybenzene. |
| o-Chloro-p-dimethyl-aminobenzaldehyde | o-Chloro-p-dimethyl-aminobenzalmalononitrile | m-Chloro-N,N-dimethyl-p-tricyanethylaniline | m-Chloro-N,N-dimethyl-p-tricyanovinylaniline. |

The process of this invention is of broad application as it is adapted for the oxidation of any compound in which the alpha, beta, beta-tricyanoethyl substituent is bonded to carbon, to the corresponding tricyanovinyl compound. For example, heterocyclic compounds such as N-methyl-alpha-(alpha, beta, beta-tricyanoethyl)pyrrole and, N-methyl-alpha,alpha'-dimethyl-beta-(alpha, beta,beta-tricyanoethyl)pyrrole can be readily oxidized to the corresponding tricyanovinyl compounds, and aliphatic compounds such as 1,1,2-tricyano-n-butane and 1,1,2-tricyano-3,3-dimethyl-n-butane can be readily oxidized to the corresponding tricyanovinyl compounds. Oxidation of aromatic compounds is shown in Examples I to III.

The new class of compounds herein described are useful for a number of purposes. For example, they are potent sources of hydrogen cyanide and, because of this, are useful as insecticides. However, they are primarily useful as dyes. The impart strong, wash-fast and fade-resistant colors to textile materials and are particularly valuable as dyes for textile materials made of synthetic fibers including "Orlon" acrylic fiber and "Dacron" polyester fiber.

The use of these compounds as dyes is shown by the following:

A solution of 3 parts of N,N-dimethyl-4-tricyanovinyl-aniline in 50 parts of dimethylformamide is added to a boiling solution of 10 parts of sodium lauryl sulfate in 1000 parts of distilled water. This mixture is heated and stirred at 90–95° C. until a uniform dispersion is obtained. Skeins of cellulose acetate fibers are soaked and stirred in this mixture for 15 minutes. The skeins are washed exhaustively with hot water and dried. This treatment imparts a bright red, light-fast color to the cellulose acetate.

As many apparently widely different embodiments of this invention may be made without departing from the spirit and scope thereof, it is to be understood that the invention is not limited to the specific embodiments thereof except as defined in the appended claims.

The invention claimed is:

1. The new class of C-tricyanovinyl compounds characterized by having a tricyanovinyl substituent on an aromatic ring of an aromatic grouping selected from the group consisting of carbocyclic aromatic hydrocarbon and heterocyclic aromatic having four carbons and a single hetero atom in a five-membered ring, by having the tricyanovinyl substituent bonded directly to an annular carbon of the aromatic ring and by having a second annular ring member selected from the group consisting of nitrogen having only two bonds attached to the ring, oxygen, sulfur, and, where R represents hydrocarbon and substituted hydrocarbon radicals, carbon having three bonds attached to the ring and bonded to —NR$_2$, —NHR, —NH$_2$, —OH, —OR, —SO$_3$H, —SO$_3$R, —COOH, —COOR and halogen auxochrome substituents.

2. The process for preparing a C-tricyanovinyl compound which comprises oxidizing the alpha, beta, beta-tricyanoethyl group of a compound characterized by having the alpha, beta, beta-tricyanoethyl group attached to an aromatic ring of an aromatic substituent selected from the group consisting of carbocyclic aromatic hydrocarbon and heterocyclic aromatic having four carbons and a single hetero atom in a five-membered ring, by having the alpha, beta, beta-tricyanoethyl group bonded directly to an annular carbon of the aromatic annular ring and by having a second annular ring member selected from the group consisting of nitrogen having only two bonds attached to the ring, oxygen, sulfur, and, where R represents hydrocarbon and substituted hydrocarbon radicals, carbon having three bonds attached to the ring and bonded to —NR$_2$, —NHR, —NH$_2$, —OH, —OR, —SO$_3$H, —SO$_3$R, —COOH, —COOR and halogen auxochrome substituents.

3. Process as set forth in claim 2 wherein said oxidation is effected at a temperature of 40° C. to 150° C. and an oxidizing potential of +.70 to +2.00 volts.

4. Process as set forth in claim 3 wherein said oxidation is carried out in an inert solvent for said tricyanoethyl compound.

No references cited.

UNITED STATES PATENT OFFICE

CERTIFICATE OF CORRECTION

Patent No. 2,889,335                                             June 2, 1959

Richard E. Heckert

It is hereby certified that error appears in the printed specification of the above numbered patent requiring correction and that the said Letters Patent should read as corrected below.

Column 1, line 36, for "is bonded" read -- it is bonded --; column 10, line 70, for "48,000" read -- 49,000 --; column 11, lines 65 and 66, for "mixtures" read -- mixture --; column 15, line 19, for "The" read -- They --.

Signed and sealed this 10th day of November 1959.

(SEAL)
Attest:

KARL H. AXLINE                                          ROBERT C. WATSON

Attesting Officer                                         Commissioner of Patents